United States Patent [19]

Pipper et al.

[11] Patent Number: 4,973,655
[45] Date of Patent: Nov. 27, 1990

[54] CONTINUOUS PRODUCTION OF LINEAR THERMOPLASTIC POLYESTERS

[75] Inventors: Gunter Pipper, Bad Duerkheim; Georg N. Simon, Limburgerhof; Gerhard Heinz, Weisenheim, all of Fed. Rep. of Germany; Peter Ittemann, Fort Mill, S.C.; Gisbert Schleier, Heidelberg, Fed. Rep. of Germany

[73] Assignee: BASF Aktiengesellschaft, Ludwigshafen, Fed. Rep. of Germany

[21] Appl. No.: 365,125

[22] Filed: Jun. 12, 1989

[30] Foreign Application Priority Data

Jun. 15, 1988 [DE] Fed. Rep. of Germany ....... 3820362

[51] Int. Cl.$^5$ .............................................. C08G 63/88
[52] U.S. Cl. ..................... 528/272; 528/300; 528/301; 528/308; 528/308.3; 528/484
[58] Field of Search ............... 528/272, 300, 301, 308, 528/308.3, 484

[56] References Cited

U.S. PATENT DOCUMENTS 4,056,514 11/1977 Strehler et al. ...................... 528/274
4,289,895 9/1981 Burkhardt et al. .................... 560/92

FOREIGN PATENT DOCUMENTS 1926767 5/1969 Fed. Rep. of Germany .

Primary Examiner—John Kight, III
Assistant Examiner—Sam A. Acquah
Attorney, Agent, or Firm—Keil & Weinkauf

[57] ABSTRACT

A process for the continuous production of linear thermoplastic polyesters comprises the following steps:

(a) passing a transesterification or esterification product of an aliphatic or aromatic dicarboxylic acid having a molecular weight of <300 or an ester-forming derivative thereof with an aliphatic or cycloaliphatic diol having a molecular weight of <250 which may additionally contain a poly(alkylene oxide) glycol having a molecular weight of 400 to 4000 at from 250° to 360° C. under a pressure of 0.5 to 20 mmHg downward in the course of a residence time of from 3 to 10 minutes through an essentially upright tubular precondensation zone equipped with internal fitments having a free surface area of from 0.3 to 1.5 m$^2$/l to form a precondensate and a vaporous diol having a molecular weight <250, (b) separating into a precondensate and vaporous diol and (c) further condensing the precondensate in the bottom phase at from 240° to 290° C. under a pressure of from 0.5 to 20 mmHg in the course of a residence time from 10 to 40 minutes and dishcharging granulable polyester.

6 Claims, No Drawings

CONTINUOUS PRODUCTION OF LINEAR THERMOPLASTIC POLYESTERS

Linear thermoplastic polyesters such as polyethylene terephthalate and polybutylene terephthalate are produced on a large scale in industry. Either dicarboxylic acids are esterified directly with diols, or dicarboxylic esters, such as dimethyl terephthalate, are transesterified with diols, and the resulting esterification product is polycondensed in the melt with elimination of diols. However, the polycondensation is not without its problems since, at the condensation temperatures required, parallel decomposition reactions take place which are deleterious to the quality of the polyester product.

DE-A-1,926,767 discloses a process for producing polyesters wherein the transesterification product is passed downward through a flattened pipe to form a film on the inner surface of the pipe and a temperature of 240° to 320° C. and a pressure of 0.1 to 600 mmHg are maintained, vaporous products and precondensate are then separated, and the precondensate is removed from the separator. This process has the disadvantage that the flattened regions are very easily blocked and, what is more, the formation of the thin film is not controllable, resulting in variable quality. This route has therefore been abandoned in industry in favor of another technique. As is known from DE-A-2,514,116, in the production of polybutylene terephthalate the transesterification mixture is passed upward through a tube bundle with a delay vessel at the top to form a vapor phase. However, the condensate thus obtained has the disadvantage that it is neither granulable nor usable as it is for a solid phase condensation.

It is an object of the present invention to provide a continuous process for producing linear thermoplastic polyesters which gives in a short time a granulable polyester condensate of consistent quality which is easily further condensable in the solid phase to give high molecular weight products.

We have found that this object is achieved by a process for the continuous production of a linear thermoplastic polyester, comprising the following steps:

(a) passing a transesterification or esterification product of an aliphatic or aromatic dicarboxylic acid having a molecular weight of <300 or an ester-forming derivative thereof with an aliphatic or cycloaliphatic diol having a molecular weight of <250 which may additionally contain a poly(alkylene oxide) glycol having a molecular weight of 400 to 4000 at from 250° C. to 360° C. under a pressure of 0.5 to 20 mmHg downward in the course of a residence time of from 3 to 10 minutes through an essentially upright tubular precondensation zone equipped with internal fitments having a free surface area of from 0.3 to 1.5 $m^2/l$ to form a precondensate and a vaporous diol having a molecular weight <250, (b) separating the precondensate and the vaporous diol and (c) further condensing the precondensate in the bottom phase at from 240° to 290° C. under a pressure of from 0.5 to 20 mmHg in the course of a residence time from 10 to 40 minutes and discharging granulable polyester.

The novel process has the advantage that it produces the polyester in a short time without damaging it and without blockages in the precondensation zone. The novel process has the further advantage that the polyester produced is immediately granulable and suitable for a solid phase condensation to a high molecular weight polyester.

According to the invention, the starting materials are transesterification or esterification products of aliphatic and/or aromatic dicarboxylic acids having a molecular weight <300 or ester-forming derivatives thereof with aliphatic and/or cycloaliphatic diols having a molecular weight of <250 which may additionally contain poly(alkylene oxide) glycols having a molecular weight of from 400 to 4000.

Suitable aliphatic dicarboxylic acids are for example alkanedicarboxylic acids of 4 to 12 carbon atoms, in particular straight-chain $\alpha,\beta$-dicarboxylic acids of the number of carbon atoms mentioned, such as adipic acid, glutaric acid, azelaic acid or dodecanedioic acid.

Preferred aromatic dicarboxylic acids have from 8 to 14 carbon atoms with the carboxyl groups bonded to an isolated or fused benzene ring. If more than one aromatic ring is present, they are linked together by a chemical bond or a divalent radical such as —O—, —SO$_2$— or —CO—. Suitable aromatic dicarboxylic acids are for example terephthalic acid, isophthalic acid, phthalic acid, naphthalenedicarboxylic acid, 4,4'-dicarboxybiphenyl, bis(p-carboxyphenyl) ether, bis(p-carboxyphenyl) sulfone, bis(p-carboxyphenyl) ketone and mixtures thereof. Particular preference is given to benzene dicarboxylic acids, in particular terephthalic acid and isophthalic acid.

Instead of the dicarboxylic acids mentioned it is in each case also possible to use their ester-forming derivatives such as esters with lower alkanols, for example methyl esters.

Preferred aliphatic diols are alkanediols of from 2 to 6 carbon atoms, in particular straight-chain alkanediols of the number of carbon atoms mentioned. Particular importance has been attained by alkanediols of 2 to 4 carbon atoms. It is possible to use, for example, ethanediol, 1,3-propanediol, 1,4-butanediol and 1,6-hexanediol. Other suitable diols are cycloaliphatic diols of from 8 to 10 carbon atoms, for example 1,4-cyclohexanediol or dimethylolcyclohexane and even mixtures of the diols mentioned.

Preferred poly(alkylene oxide) glycols are poly(C$_2$-C$_4$-alkylene oxide) glycols having a molecular weight of 400 to 4000, in particular from 600 to 2000.

To prepare the esterification products, the aforementioned starting materials are heated together, for example to from 160° to 230° C., in the presence of catalysts, for example tetrabutyl orthotitanate, with continuous removal of water. However, preference is given to starting from transesterification products obtained by transesterifying dicarboxylic esters, for example methyl esters, with the aforementioned diols and any poly(alkylene oxide) glycols at from 160° to 230° C. with continuous removal of the alkanols in the presence of customary transesterification catalysts such as zinc, calcium or manganese compounds and also titanium compounds, such as titanic esters, for example tetrabutyl orthotitanate, or titanyl compounds in amounts of 0.02 to 0.3% by weight, based on dicarboxylic ester.

Both in an esterification and in a transesterification, each mole of dicarboxylic acid or ester is used together with from 1.1 to 1.8 moles, in particular from 1.2 to 1.7 moles, of a diol having a molecular weight of <250. If poly(alkylene oxide) glycols are used, they are added in the desired amount.

To produce preferred poly-$C_2$-$C_4$-alkylene terephthalates, starting materials are terephthalic acid or ester and $C_2$-$C_4$ alkanols. Other preferred polymers are segmented polyesters composed of 15 or more mol %, preferably 50 to 70 mol %, of polyalkylene terephthalate units and not more than 85 mol %, preferably from 10 to 15 mol %, of long-chain terephthalate units with poly($C_2$-$C_4$-alkylene oxide) glycols; up to 30 mol % of terephthalic acid may be replaced by isophthalic acid. In the preparation of the starting mixture, the low molecular weight dicarboxylic acid and diol components are combined with corresponding amounts of added poly($C_2$-$C_4$-alkylene oxide) glycols.

According to the invention, the transesterification or esterification product is passed in stage a) downward through an essentially perpendicular tubular precondensation zone. The precondensation zone advantageously has a diameter of from 30 to 50 mm and a length:diameter ratio of from 133 to 80:1. The precondensation zone is maintained at from 250° to 360° C., in particular at from 260° to 320° C. Furthermore, a residence time of from 3 to 10 minutes, in particular of 4 to 7 minutes, is maintained in the precondensation zone. The precondensation is carried out under a pressure of from 0.5 to 20 mmHg, in particular of 0.5 to 10 mmHg. The specified pressure relates to the end part of the precondensation zone since the starting mixture is fed in at the top of the precondensation zone under a higher pressure, for example from 0.5 to 0.8 bar, and the pressure decreases to the aforementioned value in the course of the precondensation zone. In the course of the precondensation, diols having a molecular weight <250 evaporate to form a two-phase mixture of precondensate and vaporous diols.

To ensure thorough mixing of the two-phase mixture of precondensate and vaporous diols, the precondensation zone has been provided with internal fitments. The internal fitments have a free surface area of from 0.3 to 1.5 $m^2$ per 1. Suitable internal fitments are for example packings, such as Raschig rings or Pall rings. It has proved to be particularly advantageous if in the top third of the precondensation zone the internal fitments have a free surface area of from 0.9 to 1.5 $m^2$ per 1 and the remaining two thirds of the precondensation zone a free surface area of from 0.3 to 0.5 $m^2$ per 1.

The precondensate emerging from the precondensation zone generally has a relative viscosity of from 1.06 to 1.18, in particular from 1.12 to 1.14.

The two-phase mixture of vapors and precondensate emerging from the precondensation zone is separated. In general, separation takes place automatically, owing to the physical differences, in a separator, the bottom part of which is advantageously constructed as a condensation zone. The evolved vapors consist essentially of diols having a molecular weight <250 which were used to prepare the starting mixture. These vapors are advantageously condensed, purified by distillation and reused for the reaction.

The precondensate obtained is further condensed in a condensation stage (c) at from 240° to 290° C., in particular from 260° to 280° C., under a pressure of from 0.5 to 20 mmHg, preferably from 0.5 to 10 mmHg, in the course of a residence time of from 10 to 40 minutes, in particular from 25 to 35 minutes, to give a granulable polyester condensate. The polyester thus obtained has in general a relative viscosity of from 1.2 to 1.5. It will be readily understood that the condensation temperature used is above the melting point of the particular polyester to be produced.

To obtain high molecular weight polyesters, a preferred procedure comprises introducing the condensate thus obtained in the form of a liquid melt into a further condensation zone and condensing it there with continuous formation of new surfaces at from 270° to 290° C. under a pressure of for example from 0.5 to 2.0 mmHg until the desired viscosity is obtained. A suitable procedure is described for example in DE-A-2,514,116.

In another preferred procedure, the condensation to high molecular weight polyesters is carried out in the solid phase. The extruded and granulated polyester from stage (c) is condensed by means of hot inert gasses such as nitrogen or carbon dioxide at from 5° to 40° C. below the melting point of the particular polyester to be condensed until the desired viscosity is obtained.

Customary additions, such as delusterants, for example titanium oxide, or stabilizers and additions of fibrous or particulate fillers, flameproofing agents or impact modifiers, are preferably mixed, for example in an extruder, into the polyester discharged from stage (c), and the resulting granules are then subjected to solid phase condensation.

The polyesters produced by the process of the invention are suitable for manufacturing filaments, fibers, films and moldings.

The process according to the invention is illustrated by the following Examples:

EXAMPLE 1

In a reaction vessel, 36.75 kg of dimethyl terephthalate (189.2 mol), 28.3 kg of 1,4-butanediol (314 mol), 14.5 kg of polytetrahydrofuran having a molecular weight of 1000 (14.5 mol), 4 kg of toluene as an entrainer and 33 g of tetrabutyl orthotitanate (600 ppm based on the polymer) were heated to 190° C. under atmospheric pressure for 2 hours, during which the methanol formed in the course of the transesterification was distilled off continuously. The transesterification product thus obtained, having a relative viscosity of 1.050 (measured in 0.5% strength in 1:1 phenol/o-dichlorobenzol at 25° C.) was condensed in a precondensation zone, 30 mm diameter and 4000 mm length, packed with Raschig rings, as follows. In the upper third, the free surface area was 0.9 $m^2$/1, while in the remaining two thirds of the precondensation zone it was 0.5 $m^2$/1. The transesterification mixture was metered in at the top at a rate of 4 kg per hour together with 400 ppm of tetrabutyl orthotitanate and passed at 285° C. under a pressure of from 3 to 8 mmHg through the precondensation zone in the course of a residence time of 5 min to form vaporous butanediol and a precondensate. The mixture of precondensate and vaporous 1,4-butanediol emerging from the precondensation zone was separated in a separator from the vaporous butanediol. The precondensate had a relative viscosity of 114. The melt was left in the separator, which served as the condensation zone, for a further 35 minutes at 275° C. under a pressure of from 3 to 8 mmHg and was then discharged by means of a gear pump in the form of extrudates, consolidated in a water bath and then granulated.

The granules thus obtained were subjected to a 40-hour solid-phase condensation at 210° C. under nitrogen to give a relative viscosity of 2.01 μm/g.

We claim:

1. A process for the continuous production of a linear thermoplastic polyester, comprising the following steps:
   (a) passing a transesterification or esterification product of an alkanedicarboxylic acid of 4 to 12 carbon atoms or an aromatic dicarboxylic acid of 8 to 14 carbon atoms each having a molecular weight of <300 or an ester-forming derivative thereof with an alkane diol of from 2 to 6 carbon atoms or a cycloaliphatic diol of from 8 to 10 carbon atoms each having a molecular weight of <250 which may additionally contain a poly ($C_2$–$C_4$-alkylene oxide) glycol having a molecular weight of 400 to 4000 at from 250° C. to 360° C. under a pressure of 0.5 to 20 mmHg downward in the course of a residence time of from 3 to 10 minutes through an essentially upright tubular precondensation zone equipped with internal fitments having a free surface area of from 0.3 to 1.5 $m^3/l$ to form a precondensate and a vaporous diol having a molecular weight <250,
   (b) separating the precondensate and the vaporous diol and
   (c) further condensing the precondensate in the bottom phase at from 240° to 290° C. under a pressure of from 0.5 to 20 mmHg in the course of a residence time from 10 to 40 minutes and discharging granulable polyester.

2. A process as defined in claim 1, wherein the precondensation zone has in the top third an inner surface area of from 0.9 to 1.5 $m^2/l$ and the remaining two thirds an inner surface area of from 0.3 to 0.5 $m^2/l$.

3. A process as defined in claim 1, wherein a residence time of from 4 to 7 minutes is maintained in stage (a).

4. A process as defined in claim 1, wherein the condensation in the precondensation zone is carried to a relative viscosity of from 1.06 to 1.18.

5. A process as defined in claim 1, wherein the condensation in stage (c) is carried to a relative viscosity of from 1.20 to 1.50.

6. A process as defined in claim 1, wherein following stage (c), the polyester is further condensed in solid form at from 5° to 40° C. below the melting point of the polyester in solid phase in an inert gas atmosphere.

* * * * *